United States Patent
Guevara Diaz et al.

(10) Patent No.: US 11,719,842 B2
(45) Date of Patent: Aug. 8, 2023

(54) MACHINE LEARNING PLATFORM FOR PROCESSING DATA MAPS

(71) Applicants: International Business Machines Corporation, Armonk, NY (US); Shell USA, Inc., Houston, TX (US)

(72) Inventors: Jorge Luis Guevara Diaz, Sao Paulo (BR); Bianca Zadrozny, Rio de Janeiro (BR); Breno William Santos Rezende de Carvalho, Rio de Janeiro (BR); Alvaro Bueno Buoro, Rio de Janeiro (BR); Matthias Kormaksson, Rio de Janeiro (BR); Ligang Lu, Sugar Land, TX (US); John Tolle, Houston, TX (US); Detlef Hohl, Sugar Land, TX (US); Jan Limbeck, Amsterdam (NL); Mingqi Wu, Houston, TX (US)

(73) Assignees: International Business Machines Corporation, Armonk, NY (US); Shell USA, Inc., Houston, TX (US)

( * ) Notice: Subject to any disclaimer, the term of this patent is extended or adjusted under 35 U.S.C. 154(b) by 1167 days.

(21) Appl. No.: 16/191,112

(22) Filed: Nov. 14, 2018

(65) Prior Publication Data

US 2020/0150305 A1  May 14, 2020

(51) Int. Cl.
*G01V 1/50* (2006.01)
*G06N 5/022* (2023.01)
(Continued)

(52) U.S. Cl.
CPC ............ *G01V 1/50* (2013.01); *G01V 1/22* (2013.01); *G01V 1/306* (2013.01); *G06N 5/022* (2013.01); *G06N 7/00* (2013.01); *G06N 20/00* (2019.01)

(58) Field of Classification Search
CPC . G01V 1/50; G01V 1/22; G01V 1/306; G01V 99/00; G01V 2210/61;
(Continued)

(56) References Cited

U.S. PATENT DOCUMENTS

| 7,225,078 B2 | 5/2007 | Shelley et al. |
| 2009/0119082 A1* | 5/2009 | Fitzpatrick ............. G01V 11/00 703/10 |

(Continued)

FOREIGN PATENT DOCUMENTS

| CN | 101103351 A | * | 1/2008 | |
| CN | 101438176 B | * | 5/2013 | ............. G01V 3/083 |

(Continued)

OTHER PUBLICATIONS

Fitzpatrick et al., "Reservoir fracture simulations", U.S. Patent Application Publication 2009/0119082, May 2009., see shortened version.*

(Continued)

*Primary Examiner* — Kandasamy Thangavelu
(74) *Attorney, Agent, or Firm* — Stephen R. Yoder

(57) ABSTRACT

A system, method and program product for implementing a machine learning platform that processes a data map having feature and operational information. A system is disclosed that includes an interpretable machine learning model that generates a function in response to an inputted data map, wherein the data map includes feature data and operational data over a region of interest, and wherein the function relates a set of predictive variables to one or more response variables; an integration/interpolation system that generates the data map from a set of disparate data sources; and an analysis system that evaluates the function to predict outcomes at unique points in the region of interest.

16 Claims, 9 Drawing Sheets

(51) Int. Cl.
*G01V 1/22* (2006.01)
*G06N 7/00* (2023.01)
*G01V 1/30* (2006.01)
*G06N 20/00* (2019.01)

(58) Field of Classification Search
CPC ... G01V 2210/6161; G01V 2210/6167; G01V 2210/6169; G01V 2210/644; G01V 11/00; G01V 3/083; G01V 3/12; G06N 5/022; G06N 7/00; G06N 20/00; G06N 5/048; G06N 7/005; G06N 5/045; G06N 20/10; G06N 20/20; E21B 47/07; E21B 47/065; E21B 43/00; E21B 47/00
See application file for complete search history.

(56) References Cited

U.S. PATENT DOCUMENTS

| | | | |
|---|---|---|---|
| 2009/0248312 A1* | 10/2009 | Hsu | G01V 1/28 702/14 |
| 2013/0262069 A1 | 10/2013 | Leonard | |
| 2014/0251601 A1* | 9/2014 | Wang | E21B 47/07 166/250.01 |
| 2015/0371345 A1 | 12/2015 | Jeffers | |
| 2016/0208582 A1 | 7/2016 | Kormaksson et al. | |
| 2017/0096881 A1* | 4/2017 | Dusterhoft | G06N 20/00 |
| 2017/0315249 A1* | 11/2017 | Myers | G06F 30/23 |
| 2017/0364795 A1 | 12/2017 | Anderson et al. | |
| 2018/0334902 A1* | 11/2018 | Olsen | E21B 49/08 |
| 2019/0025461 A1* | 1/2019 | Wiener | G01V 99/005 |

FOREIGN PATENT DOCUMENTS

| | | | | |
|---|---|---|---|---|
| CN | 103278866 A | | 9/2013 | |
| EP | 3327471 A1 | * | 5/2018 | ............ E21B 43/00 |
| FR | 3027944 A1 | * | 5/2016 | ........... G01V 99/005 |
| FR | 3036210 A1 | * | 11/2016 | ................ G06F 7/11 |
| WO | WO 2005122001 A1 | * | 12/2005 | ............ G01V 11/00 |
| WO | WO 2009126375 A1 | * | 10/2009 | ............ G01V 11/00 |
| WO | WO 2010130269 A2 | * | 11/2010 | ........... G01V 11/005 |
| WO | WO 2013188241 A2 | * | 12/2013 | ............ E21B 44/00 |
| WO | WO 2017058267 A1 | * | 4/2017 | ............ E21B 43/00 |
| WO | WO 2017165949 A1 | * | 10/2017 | ............ E21B 43/00 |
| WO | 2018031014 A1 | | 2/2018 | |

OTHER PUBLICATIONS

Wang et al., "Modeling acid distribution for acid stimulation of a formation", U.S. Patent Application Publication 2014/0251601, Sep. 2014, see shortened version.*

Guevara, Jorge et al.; "A data-driven workflow for predicting horizontal well production using vertical well logs"; pp. 6.

Kormaksson, Matthias et al.; "A Data Driven Method for Sweet Spot Identification In Shale Plays Using Well Log Data"; SPE Digital Energy Conference and Exhibition; Mar. 3-5; Published 2015; Publisher: Society of Petroleum Engineers; pp. 2; <https://www.onepetro.org/conference-paper/SPE-173455-MS>.

Sharma, Ritesh Kumar et al.; "Identification of sweet spots in shale reservoir formations"; First Break; vol. 34; Sep. 2016; technical article; Copyright 2016 EAGE; www.firstbreak.org; pp. 39-47.

* cited by examiner

US 11,719,842 B2

MACHINE LEARNING PLATFORM FOR PROCESSING DATA MAPS

TECHNICAL FIELD

The subject matter of this invention relates to machine learning platforms, and more particularly to a machine learning platform that process continuous data maps to evaluate and predict outcomes in domains such as oil and gas exploration.

BACKGROUND

There exist numerous domains in which huge amounts of data are generated on a daily basis. Often, the data may be captured from different sources, involve different purposes, and be stored in different databases. The ability to use such data in a comprehensive manner to predict outcomes remains an ongoing challenge.

For example, in the field of oil/gas/water exploration, large amounts of geological data and production data are generated on a daily basis from different sources including both conventional and unconventional (e.g., shale) reservoirs. In this domain, determining where to drill, i.e., sweet spot identification techniques, relies on only limited aspects of the collected data such as geology, seismic data analysis and/or expert knowledge. This unfortunately often results in poor selections that are based on traditional physics models that do not allow for a comprehensive utilization of all data sources.

SUMMARY

Aspects of the disclosure provide an improved machine learning platform that generates and processes data maps to evaluate and predict outcomes. A data map can be obtained, integrated and interpolated from various data sources for a region of interest. An interpretable machine learning model can be utilized to generate a function that relates a set of predictive variables to one or more response variables. The function can be evaluated by experts to alter models and be utilized to predict outcomes within the region of interest.

In some aspects, Generalized Additive Models (GAMs) with shape constraints can be utilized, which are a class of interpretable machine learning models, for tasks that include: 1) encoding expert knowledge about the shape of the effects of the predictive variables and encoding the interaction among those variables; 2) quantifying the effects of the predictive variables on operations; and 3) predicting the outcome at selected locations.

In one aspect, the machine learning platform is utilized to process geological data involving unconventional reservoirs (i.e., shale), including production data and completion parameters with the aim to perform sweet spot identification. The platform provides an end-to-end data-driven solution that preprocesses and performs feature engineering of geological data and integrates those features with production data and completions. This solution can support geologists and engineers on decisions about where to drill new wells in the reservoirs and/or assist them to analyze the impact of geological data and completions on the production of reservoirs.

An aspect discloses a machine learning platform adapted to assist in oil and gas exploration, comprising: an interpretable machine learning model that generates a function in response to an inputted data map, wherein the data map includes geophysical data and operational data over a region of interest, and wherein the function relates a set of predictive variables to one or more response variables; an integration/interpolation system that generates the data map from a set of disparate data sources that includes horizontal well logs, vertical well logs and production data; and an analysis system that evaluates the function to predict outcomes at unique points in the region of interest.

A further aspect discloses a computer program product stored on a computer readable medium, which when executed by a computing system provides a machine learning platform to assist in oil and gas exploration, the program product comprising: program code for implementing an interpretable machine learning model that provides a function in response to an inputted data map, wherein the data map includes geophysical data and operational data over a region of interest, and wherein the function relates a set of predictive variables to one or more response variables; program code that generates the data map from a set of disparate data sources in which the set of disparate data sources are integrated and interpolated to provide a continuous set of data over the region of interest; and program code that evaluates the function to predict outcomes at unique points in the region of interest.

A third aspect discloses a method of using a machine learning platform to perform sweet spotting, including: integrating feature data from horizontal well logs and vertical well logs to form a set of integrated feature data; interpolating the feature data over a region of interest to generate a data map; integrating operational data into the data map, wherein the operational data includes production, completion and engineering data at different points in the region of interest; inputting the data map into a machine learning model to generate a function, wherein the function relates a set of predictive variables to one or more response variables; and analyzing the function to identify a sweet spot in the region of interest.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 1:
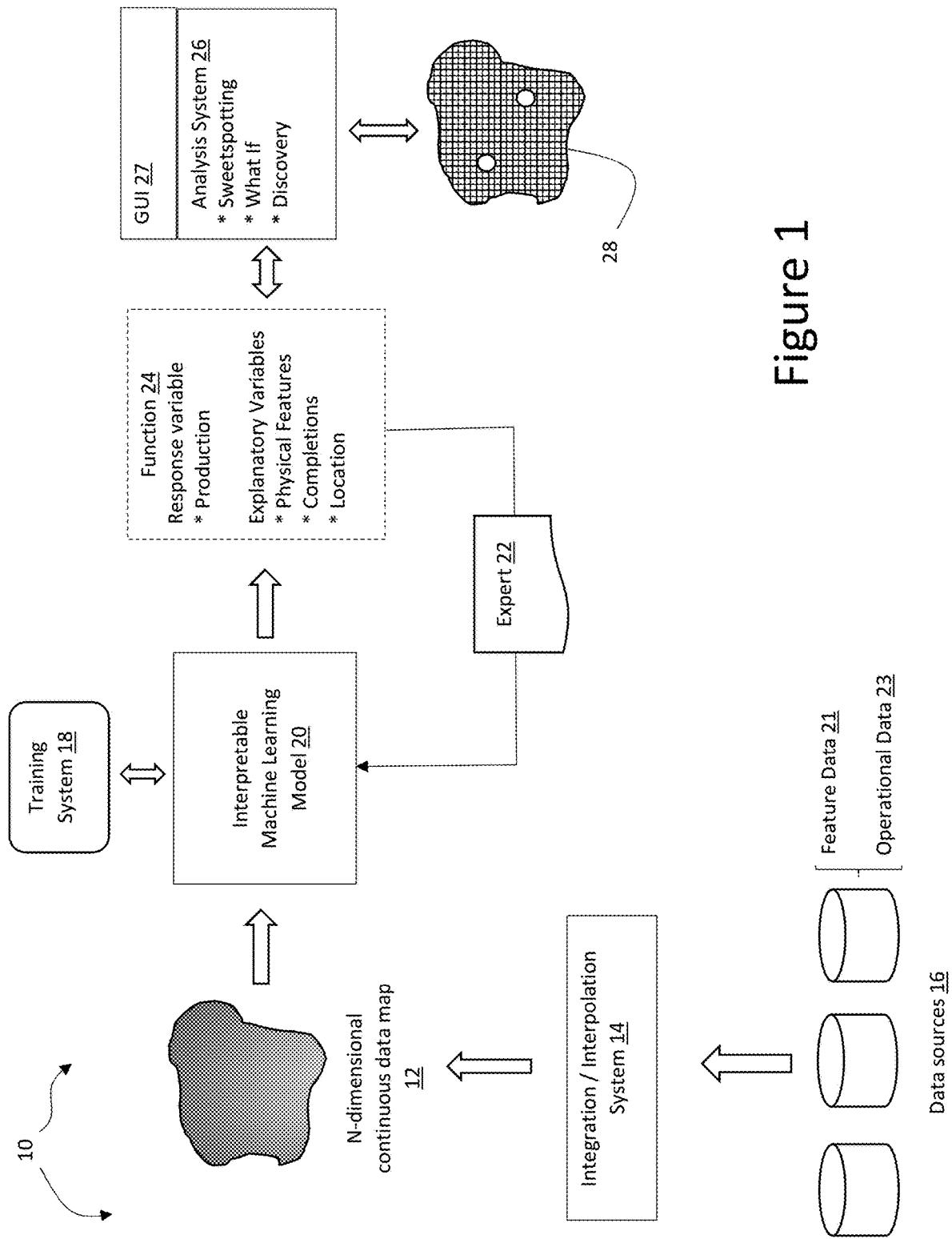
FIG. 1 shows a machine learning platform according to embodiments.

Referring now to the drawings, FIG. 1 depicts a machine learning platform 10 that includes an interpretable machine learning model 20 to process a multi-dimensional continuous data map ("data map") 12. Data map 12 can be embodied as a grid of data over a region of interest in which each point in the grid includes one or more data values. Data map 12 can represent any information domain, e.g., a physical domain such as oil/gas exploration, a virtual domain such as digital marketing, etc. As such, machine learning platform 10 is intended to provide technology improvements in the field of machine learning systems.

Data map 12 includes both feature data 21 and operational data 23 obtained from a set of disparate data sources 16. Feature data 21 refers to information that describes attributes of different points in the region of interest. For example, in a physical domain, feature data 21 can comprise geophysical attributes, agricultural information, real estate data, etc. In a virtual domain, feature data 21 can include product information, CRM (customer relationship management) information, etc. Operational data 23 refers to information that describes activities, operations, processes, performance, etc., associated with different points in the region of interest. For example, in a physical domain, operational data can comprise production results, engineering requirements, costs, etc. In a virtual domain, operational data can include sales data, click thru data, marketing efforts, profit, etc.

Data map 12 can be generated by an integration/interpolation system 14 that processes information from the various data sources 16. Integration can for example involve combining feature data 21 from different databases that fall within the same region of interest. Interpolation processes discrete points of data to create a continuous data map 12 in which each point on the data map is associated with at least one data value. In one embodiment, interpolation is performed on feature data 21 to create the continuous data map 12, to which operational data is then integrated.

Once generated, data map 12 is inputted into interpretable machine language learning model 20, which generates one or more functions 24. Each function 24 relates a set of predictive variables, such as physical features, completions, engineering requirements, etc., to one or more response variables, such as production. An illustrative function can be in the form:

$$g(E(Y))=\beta+f_1(x_1)+f_2(x_2)\ldots f_m(x_m)$$

where Y is the response variable, $x_1$, $x_2$, etc., are predictive variables, and $f_1$, $f_2$, etc., are weights, function, or other models.

Interpretable machine language learning model 20 can be trained by a training system 18 that for example uses previously collected data maps and results in the particular domain. Because the output of the interpretable machine language learning model 20 is a function 24, an expert 22 can review and modify the function 24 based on domain knowledge, and feed that domain knowledge constraints into the model 20. For example, the expert may know that a certain pair of predictive variables generally rise or fall in an inverse manner. If the function 24 indicates something else, the expert 22 can update the model 20.

In an alternative embodiment, one or more classical or black box machine learning models can be utilized in place of, or in addition to, the interpretable machine learning model 20.

Once the function 24 is generated, analysis system 26 can then evaluate the function 24 to predict outcomes in the region of interest 28 at different locations. Evaluation of the function can be handled through a graphical user interface (GUI) and can for example include identifying sweet spots, performing what-if scenarios, discovering outliers, etc.

Figure 2:
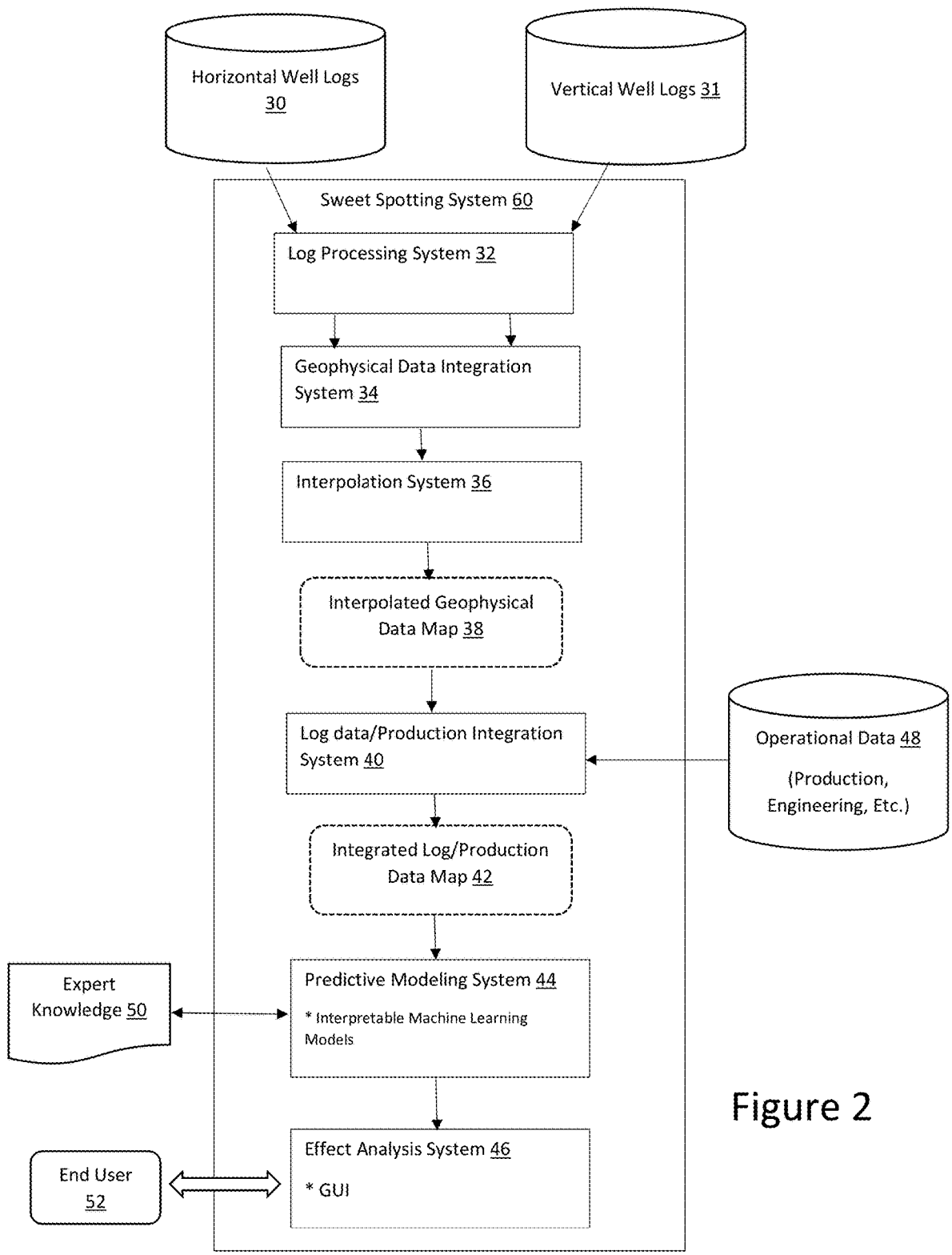
FIG. 2 shows a sweet spotting system that employs the machine learning platform of FIG. 1 according to embodiments.

FIG. 2 depicts an application of the machine learning platform 10 of FIG. 1 that performs sweet spotting in a region of interest system in an oil/gas/water exploration domain. As shown, sweet spotting system 60 generally uses feature data from horizontal well logs 30, vertical well logs 31, operational data 48 and expert knowledge 50 to provide an end-to-end data driven process to allow for the analysis of potential drilling locations, the impact of geological data and completions on the production of reservoirs, costs related to completions, etc., by end users 52, such as geologists and engineers.

Horizontal well logs 30 and vertical well logs 31 generally comprise geophysical measurements, such as gamma ray data, neutron porosity, density, etc., of a target geological formation surrounding a well. The well log data for a region of interest is initially collected and processed by log processing system 32, which, e.g., collects well logs from LAS (logic ASCII standard) files and identifies target formations, extracts respective well log sections, and identifies well parameters (e.g., top and bottom well sections, deviation angles, directional paths, actual depths, measured depths, well locations, etc.). In addition, geological measurements are extracted and preprocessed to, e.g., remove outliers, etc. In some case, horizontal well logs 30 can include some production information as well.

Once collected, the information is fed into geophysical data integration system 34, which integrates geological measurements from the horizontal well logs 30 and vertical well logs 31. Integration of the vertical well logs 31 begins with identifying geological measurements around a well which are summarized with representative values, e.g., statistics such as moments or empirical quantiles of the distribution. Integration of the horizontal well logs 30 begins with, e.g., performing a down sampling of a smoothing approximation of the physical measurements to obtain representative values across the path of the well. Once obtained, geological data integration system 34 joins the representative values from vertical wells and horizontal wells to create an expanded data source for input to interpolation system 36. Empirical distributions (e.g., using QQ plots or hypothesis testing) from both sources can be compared to validate the viability of integration.

Figure 3:
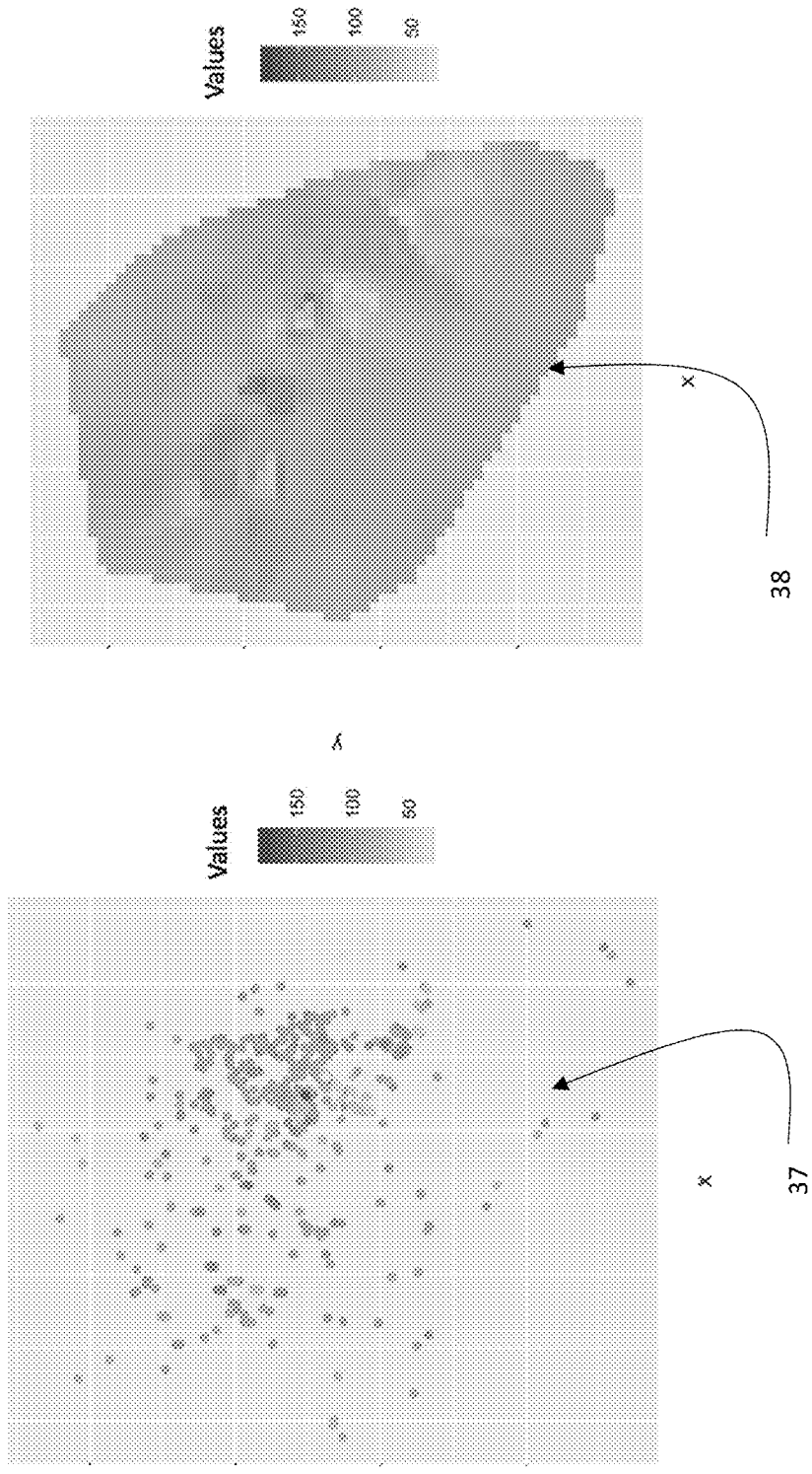
FIG. 3 shows an interpolated data map according to embodiments.

Interpolation system 26 utilizes the integrated geophysical data to estimate the unknown geological measurements across a region of interest, e.g., around production data locations. In one approach, local interpolation such as local-kriging (i.e., kriging around a vicinity) can be utilized which is useful to reduce computational overhead. Using this approach, kriging parameters are estimated from the data to provide a data-driven solution to obtaining estimated geophysical data for the region of interest. For example, FIG. 3 shows a mapping with actual integrated horizontal and vertical geophysical data 37 on the left hand side and interpolated geophysical data map 38 over a region of interest on the right hand side. Each point in the left plot indicates a horizontal/vertical wellhead position. Shading and/or color values indicate the petrophysical associated values (e.g., gamma-rays values). The right plot shows the interpolated results (the map) using kriging. The result is a continuous geophysical feature gridded map based on the interpolated physical features providing a proxy for geology.

Referring again to FIG. 2, once generated, the interpolated geophysical data map 38 is integrated with operational data 48 by log data/production integration system 40. System 40 integrates the geological proxy with production parameters (e.g., intensity of completion, fracturing pressure by length, total length of a horizontal well, etc.) to create an integrated log/production data map 42 for the region of interest.

Next the integrated log/production data map 42 is fed into a predictive modeling system 44. In one approach, an interpretable machine learning model is utilized which allows for the inclusion of expert knowledge 50 in the model. The expert knowledge 50 can be included into an interpretable machine learning model via functions such as convex, concave, monotonic increasing/decreasing, linear, etc., via sets, fuzzy sets, probability distributions, mathematical expressions, etc.

One illustrative interpretable machine learning model includes a Generalized Additive Model (GAM) with shape constraints. Thus, if an engineer (i.e., expert) knows that a variable has a monotonic concave decreasing relationship with production, then the knowledge can be coded into the GAMs using shape constraints on the GAMs spline. In a further approach, multiple models can be used, e.g., GAMs, random forest, support vector machines, Gaussian process, etc., and ranked according to predefined metrics, e.g., RMSE, MAE, MAS, etc., for sweet spot prediction.

Finally, effect analysis system 46 can be utilized by an end user 52 (or some other system) to predict outcomes in the region of interest. For example, GAMs with shape constraints can be used for discovering and characterize the main effects of explanatory values such as geological features, completions, and well locations on production. The analysis can include the use or generation of effect plots, partial residual plots, functions, etc. The resulting output can include drilling locations given by prediction maps indicating areas of highest probability for success.

A graphical user interface (GUI) can be employed that includes, e.g., a selector of vertical information attributes and horizontal information attributes; a selector of information attributes of production data; a selector of information attributes of engineering variables; a control for processing data, data exploration, correlation estimation, and correlation range; a control for geophysical data integration; a selector of interpolation models, and control for applying interpolation on the integrated geophysical data; a display for visualization of interpolation maps, statistics and data exploration of the interpolated geophysical data; a control for data integration of the interpolated geophysical data, production data and reservoir variables; a selector of machine learning models; a selector of interpretable machine learning models; a control allowing input of prior/expert knowledge into interpretable machine learning models; a control for fitting models; a display for visualization of prediction maps, prediction statistics from machine learning models over locations of interest; and a display for visualization/analysis of effects/behavior of predictive variables on production data on locations of interest.

Figure 4:
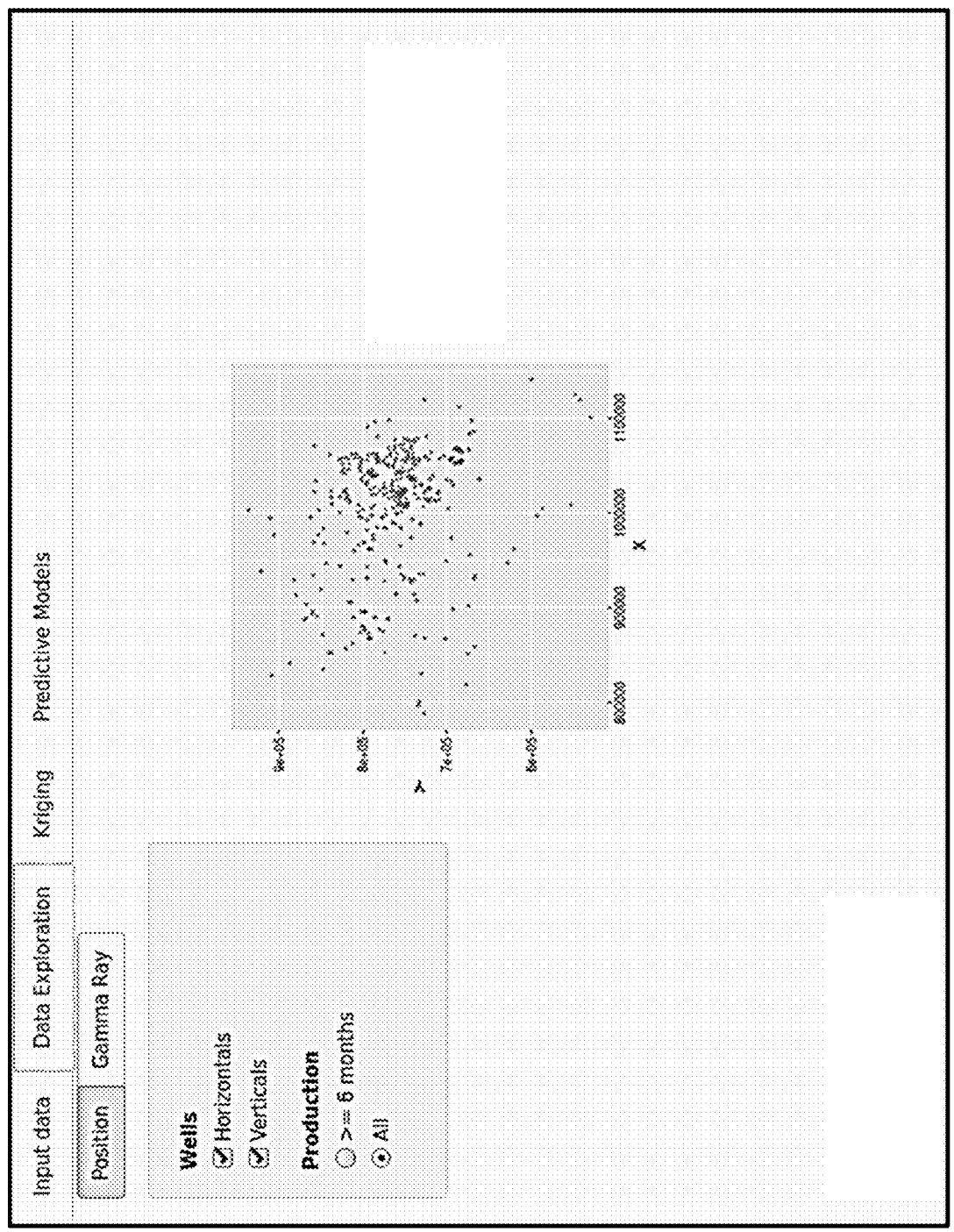
FIG. 4 depicts a GUI for integrating feature data from different sources according to embodiments.
Figure 5:
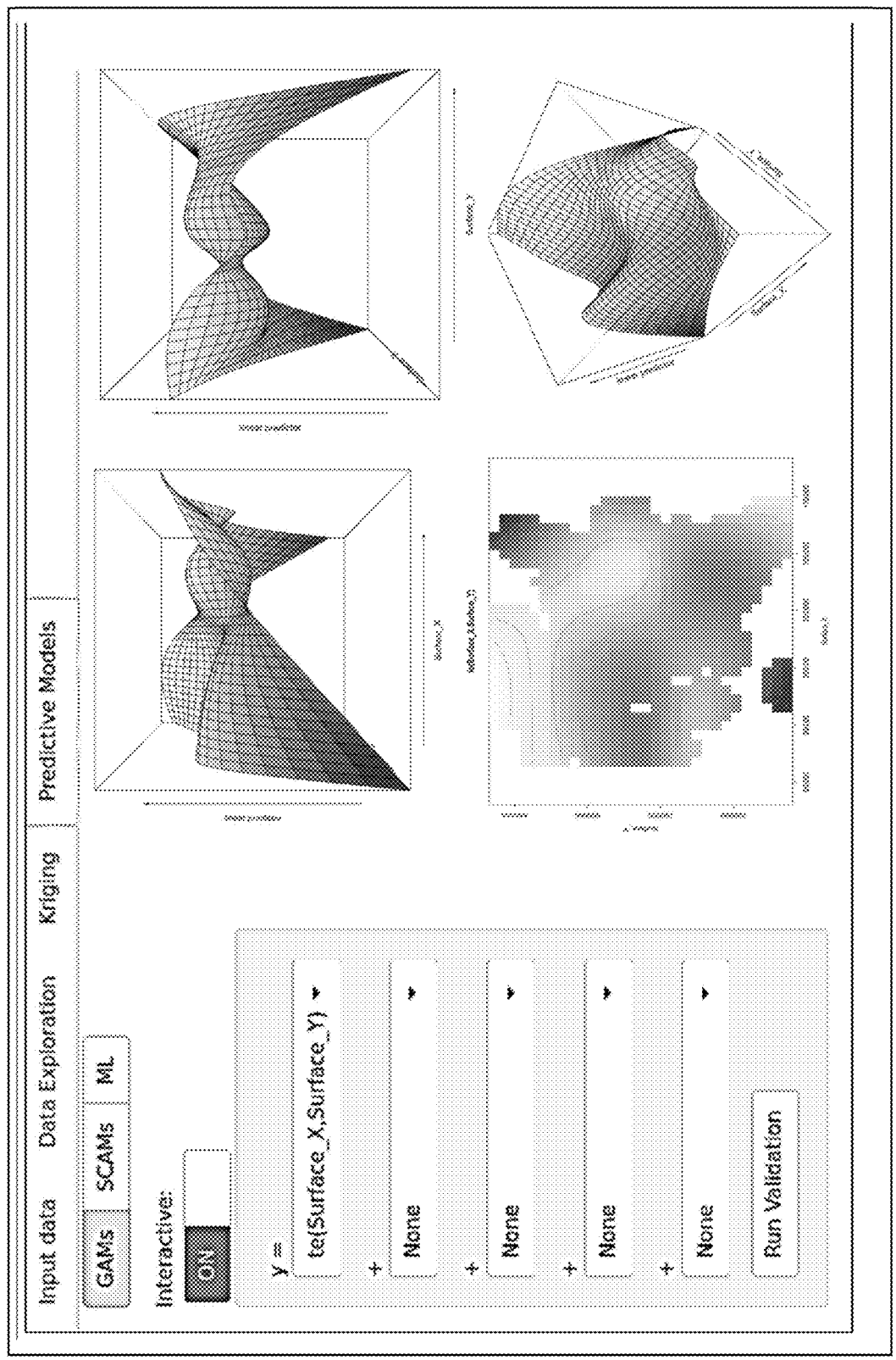
FIG. 5 depicts a GUI showing a GAMs model according to embodiments.

FIG. 4 depicts a GUI showing the integration of horizontal well data with vertical well data. FIG. 5 depicts a GUI in which the user can select and modify a model function. Namely, FIG. 5 shows how prior knowledge about the interaction among predictors can be incorporated into the ML model. In this case, assume the user knows beforehand that the predictors "surface_X" and "surface_Y" are interacting. The user can model that interaction with a smooth function (technically, GAMs use tensor product splines for that purpose). The modeling equation would be given by y=te(surface_X,surface_Y). Because the ML model is an additive model it is possible to add more terms to the equation, e.g., y=te(surface_X,surface_Y)+(new term) . . . +(new term) by replacing "none" in one or more drop down boxes with additional predictors/interaction terms. The four plots on the right show four different views of the same effect of the interaction term te(surface_X,surface_Y) on the predicted variable y (in this case the logarithm of the twelve-months of cumulative production of oil). The effect of the interaction term "te(surface_X,surface_Y)" is modeled as a 3D surface.

Figure 6:
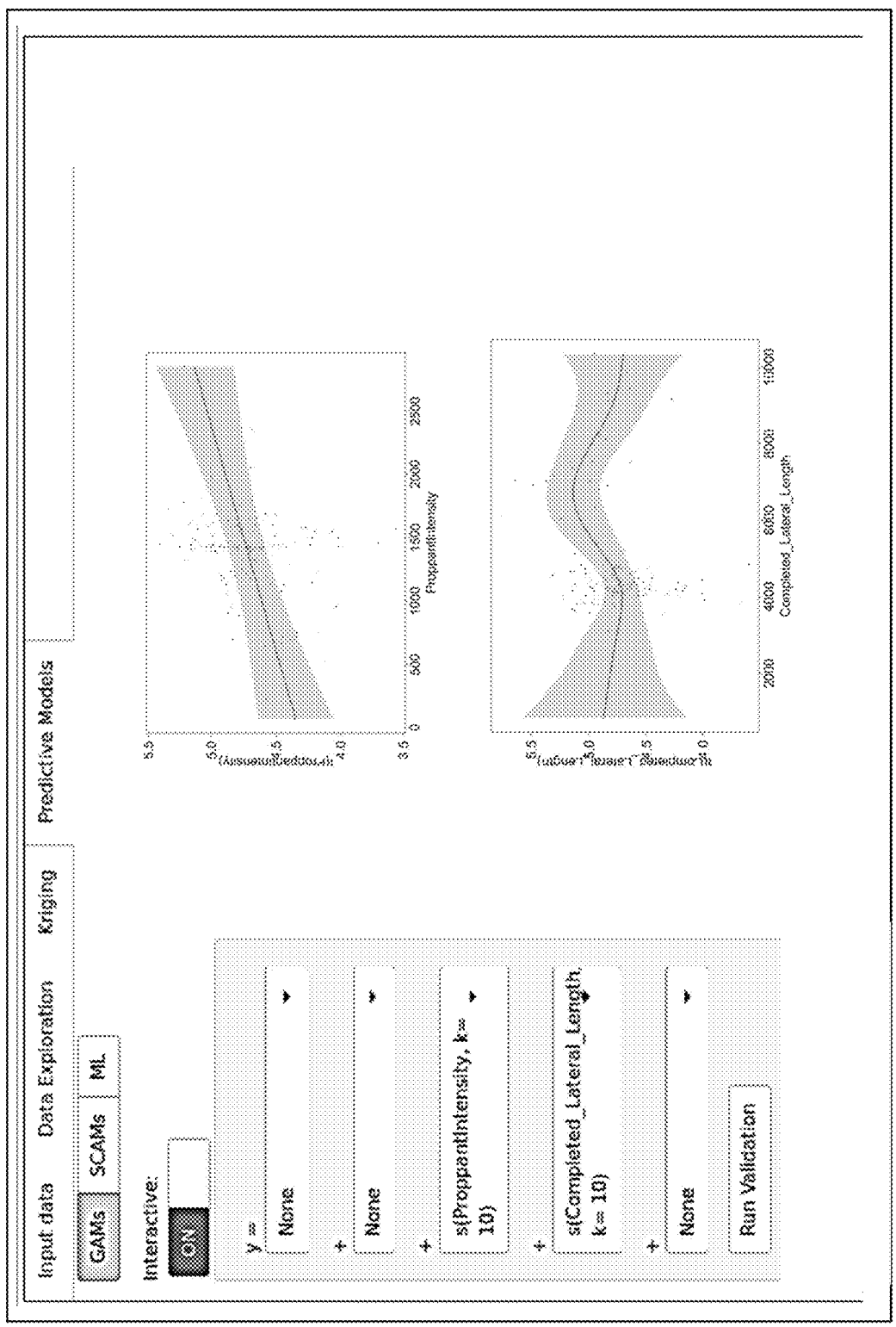
FIG. 6 depicts a GUI showing a further GAMs model according to embodiments.

FIG. 6 depicts a GUI showing a different GAMs model. In this case, the user models the predicted variable as a function of two (non-interaction) predictors: proppant intensity and completed lateral length. The only prior knowledge that the user has in this case is that there is no interaction between the variables, so the model then will be given by y=s(proppantIntensity)+s(completedLateralLength). The GAMs model then fits smooth functions (in this case regularized splines) to each predictor. Finally, the trained GAMs will plot the effect of proppant intensity on the predicted variable and the effect of completed lateral length on the predicted variable, as shown on the right hand side of FIG. 6. Technically, these plots are called "conditional plots" and a user can use them to explain the relationship between a predictor/interaction term and the predicted variable keeping the other variables to some fixed value. For example, the top plot shows the relationship between proppantIntensity and the predicted variable, given that the completed lateral length variable is fixed to its mean value.

Figure 7:
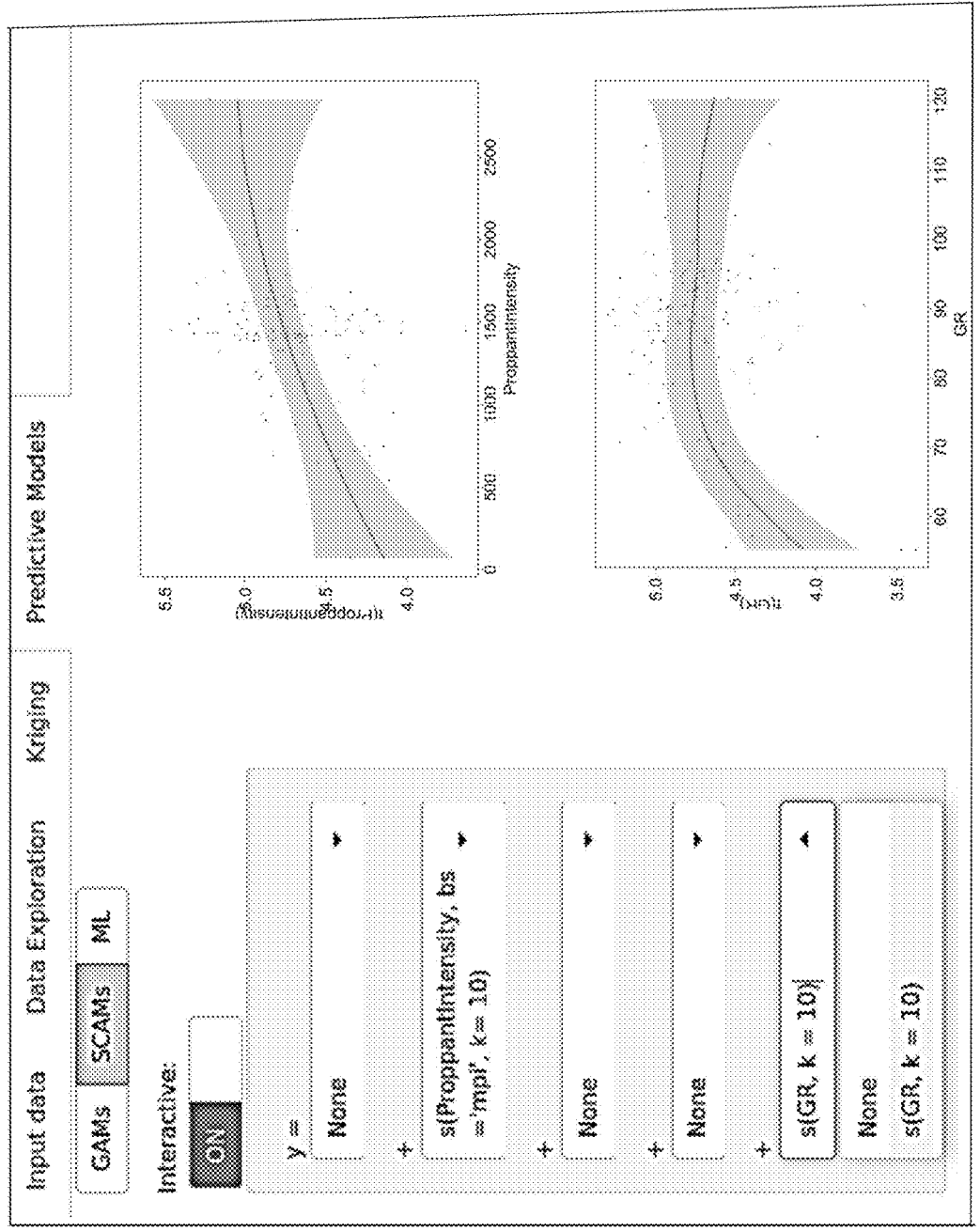
FIG. 7 depicts a GUI showing a SCAMs model according to embodiments.

FIG. 7 depicts a similar GUI, but in this case, a Shape Constraint Additive Model (SCAMs) is utilized in which the user can include prior knowledge about the relationship between predictors and the predicted variable. For example, the user can include prior knowledge about the relationship between proppant intensity and the predicted oil production, e.g., that the relationship is better modeled by a monotonic increasing and concave function. That codification is given in the dropdown box with the expression bs="mpi". Because the model is additive, more terms can be added including interaction terms, with shape constraints (e.g., bs="mpi"), or terms without constraints (e.g., traditional GAMs). In the depicted example, the user is modeling GR (gamma-ray) without constraints, that is, the user has no prior knowledge about the relationship between GR and the predicted value.

Figure 8:
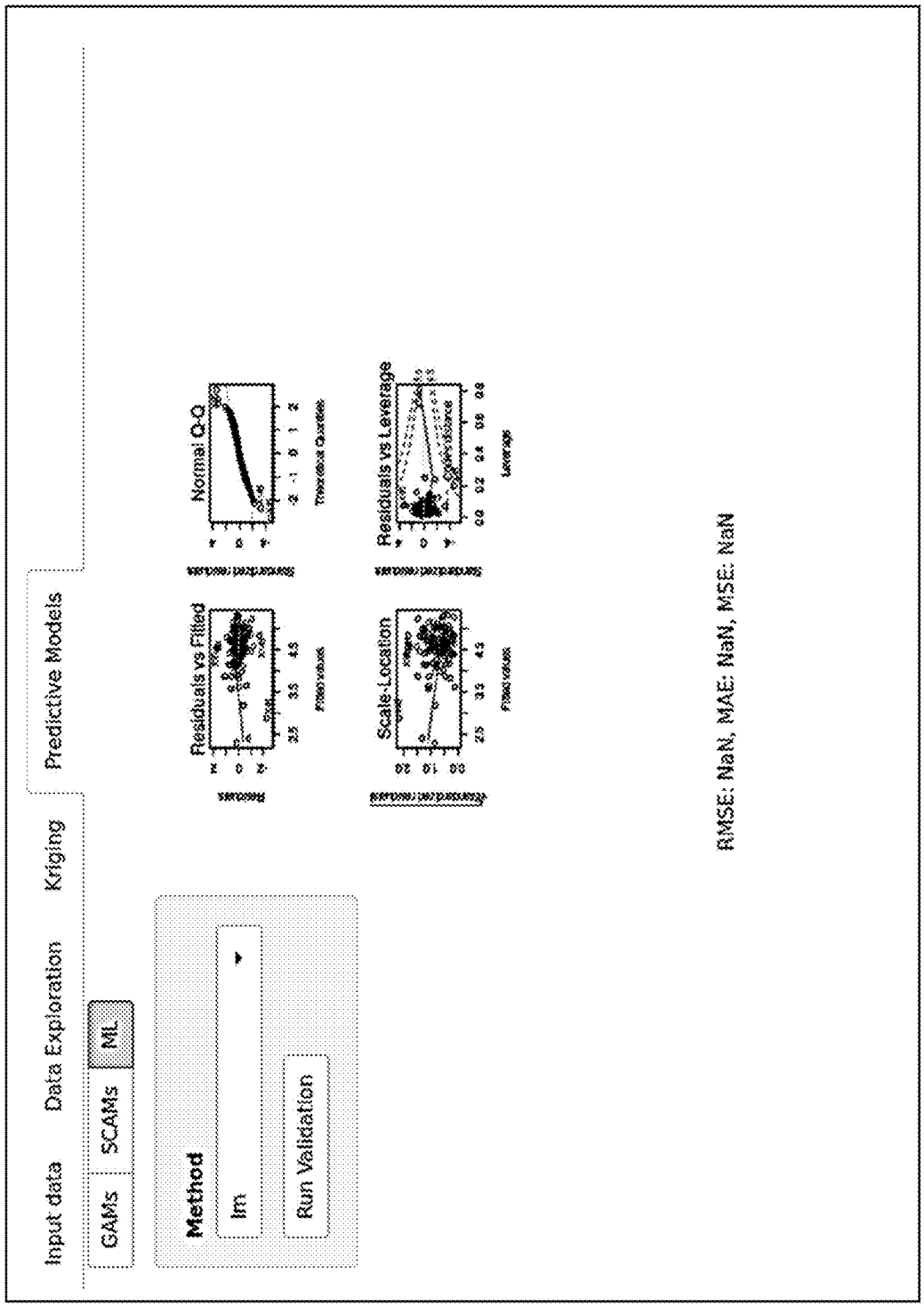
FIG. 8 depicts a GUI showing an ML (machine learning) model according to embodiments.

FIG. 8 depicts a GUI showing a machine learning (ML) model (in this case a linear regression model). In this example, a method is selected (e.g., support vector machines, random forest, linear regression, etc.) and specific plots for those models are provided. For example, if the user selects a random forest, variable importance is provided. If the user selects a support vector machine, support vectors plots are provided. The graphs basically shows four different plot for the linear regression model that would help users to better understand the role of this model for predictive modeling purposes.

An example use case of the sweet spotting system of FIG. 2 is as follows. Gamma-ray logs are obtained from horizontal 30 and vertical well logs 31 (not necessarily from production wells). The gamma-ray logs obtained from horizontal 30 and vertical well logs 31 are integrated and interpolated using local-kriging into a data map. The horizontal 30 and vertical well logs 31 are first preprocessed, e.g., to eliminate any outlier data. A smoothing approximation obtained from horizontal well logs are then down sampled to obtain a set of values. Median values are obtained from the vertical well logs 31. The values are then integrated together to form a grid of geological features (i.e., a data map).

Once the grid of geological features is computed, those features are integrated with other production data variables. Production data is obtained from a separate data source that includes completions parameters (e.g., completed lateral length and proppant intensity) from production wells, shut-in production days from production wells, well-locations (x,y coordinates) of production wells, and cumulative oil and gas production.

The resulting data map is then used in machine learning models such as a Gaussian process, Support Vector Machines, Random forest, Neural networks, GAMs, etc. GAMs is utilized with shape constraints to allow for the inclusion prior expert knowledge on the shape and effects of the predictive variables on production. For example, an expert may constrain the effect of proppant intensity to be monotonic increasing and convex, while, constraining the shut-in production days to be monotonic decreasing and concave. Additionally, the expert can code the variable interaction using high order splines, for example using a tensor product spline to code the interaction between the x and y well-coordinates. The GAM's output will be a set of functions that quantify the effects of the predictive variables on production. For example, by analyzing the tensor product spline related to those variables, the effect of well locations on production can be determined.

It is understood that the machine learning platform 10 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
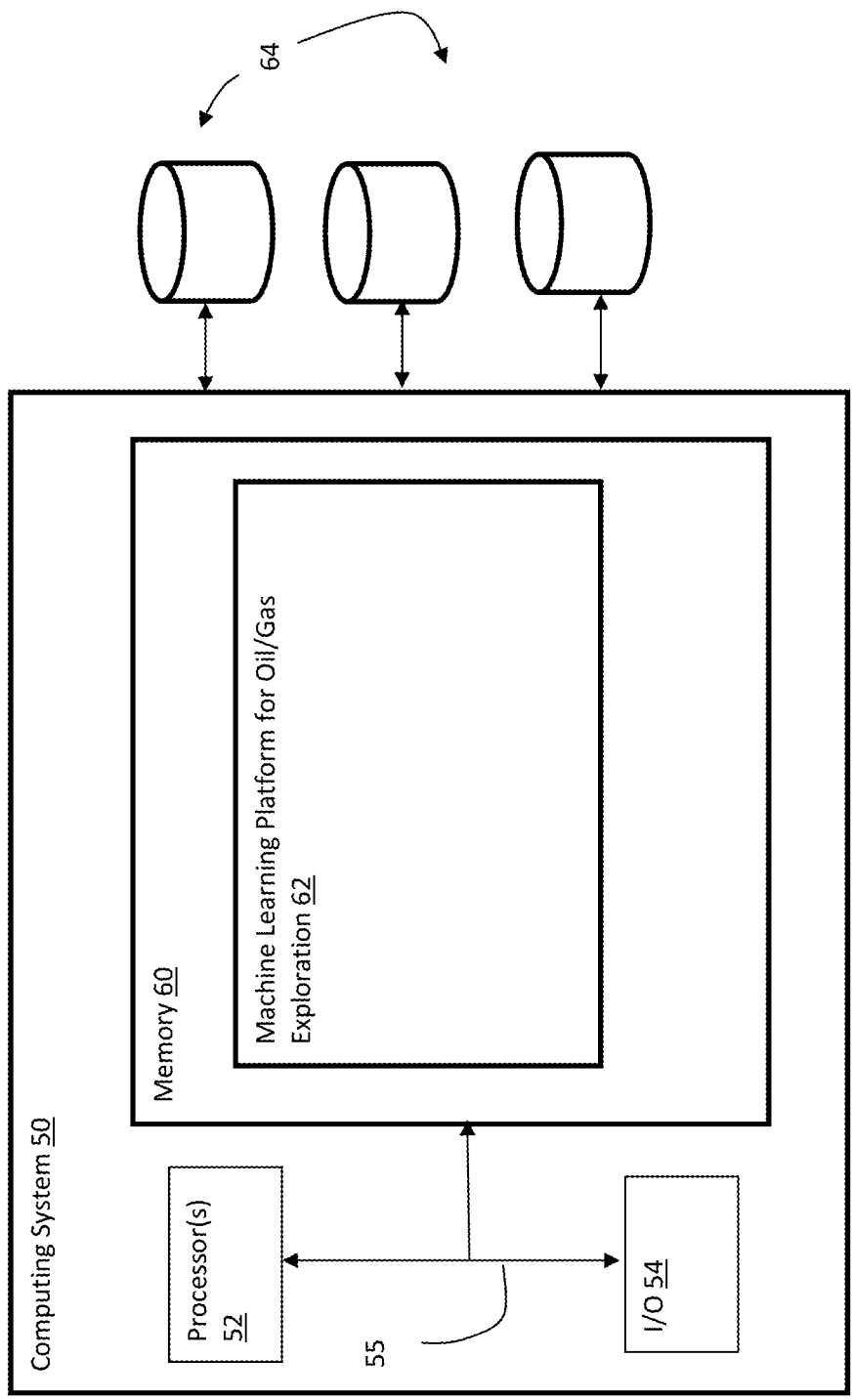
FIG. 9 shows a computing system for implementing the machine learning platform of FIG. 1 for oil/gas exploration.

FIG. 9 shows a computing system 50 having a machine learning platform 62 adapted for oil/gas exploration, which may comprise any type of computing device and for example includes at least one processor 52, memory 60, an input/output (I/O) 54 (e.g., one or more I/O interfaces and/or devices), and a communications pathway 55. In general, processor(s) execute program code which is at least partially fixed in memory. While executing program code, processor(s) can process data, which can result in reading and/or writing transformed data from/to memory and/or I/O for further processing, including databases 64. The pathway provides a communications link between each of the components in computing system. I/O can comprise one or more human I/O devices, which enable a user to interact with computing system. Computing system may also be implemented in a distributed manner such that different components reside in different physical locations.

Furthermore, it is understood that the machine learning platform or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer system including a machine learning platform to perform sweet spotting, the computer system comprising:
   a processor set; and
   a computer readable storage medium;
   wherein:
   the processor set is structured, located, connected, and/or programmed to run program instructions stored on the computer readable storage medium; and
   the program instructions which, when executed by the processor set, cause the processor set to perform a method comprising:
       collecting geophysical measurements from horizontal well logs and vertical well logs and production information from the horizontal well logs;
       extracting geological measurements from the geophysical measurements and removing outliers from the geological measurements;
       integrating feature data from horizontal well logs and vertical well logs to form a set of integrated feature data by:
           identifying extracted geological measurements around a vertical well;
           summarizing the extracted geological measurements with a set of representative vertical values including moments and empirical quantiles of a distribution;
           performing a down sampling of a smoothing approximation of the extracted geological measurements and the production information of a horizontal well to obtain a set of representative horizontal values across a path of the horizontal well; and
           joining the set of representative vertical values and the set of representative horizontal values to create the set of integrated feature data;
       generating a data map by interpolating the set of integrated feature data, the data map being continuous over a region of interest such that each data point of the set of integrated feature data is associated with at least one data value;
       integrating operational data into the data map to generate a machine-learning (ML) data map;
       generating, by an interpretable machine learning model, a function based on the ML data map, wherein the data map includes geophysical data and operational data over a region of interest, and wherein the function relates a set of predictive variables to one or more response variables;
       evaluating the function to identify one or more sweet spots at unique points in the region of interest; and
       generating a GUI for displaying and modifying the function.

2. The computer system of claim 1, wherein the geophysical data includes at least one of gamma ray measurements, neutron porosity measurements, or density measurements within the region of interest.

3. The computer system of claim 2, wherein the operational data describes production data and engineering data within the region of interest.

4. The computer system of claim 1, wherein the response variable represents production parameters.

5. The computer system of claim 1, wherein the feature data describes geophysical attributes within the region of interest.

6. A computer program product comprising a non-transitory computer readable medium having a set of instructions stored therein which, when executed by a processor, causes the processor to perform a method comprising:
   collecting geophysical measurements from horizontal well logs and vertical well logs and production information from the horizontal well logs;
   extracting geological measurements from the geophysical measurements and removing outliers from the geological measurements;
   integrating feature data from horizontal well logs and vertical well logs to form a set of integrated feature data by:
      identifying the extracted geological measurements around a vertical well;
      summarizing the extracted geological measurements with a set of representative vertical values including moments and empirical quantiles of a distribution;
      performing a down sampling of a smoothing approximation of the extracted geological measurements and the production information of a horizontal well to obtain a set of representative horizontal values across a path of the horizontal well; and
      joining the set of representative vertical values and the set of representative horizontal values to create the set of integrated feature data;
   generating a data map by interpolating the set of integrated feature data, the data map being continuous over a region of interest such that each data point of the set of integrated feature data is associated with at least one data value;
   integrating operational data into the data map to generate a machine-learning (ML) data map;
   generating, by an interpretable machine learning model, a function based on the ML data map, wherein the data map includes geophysical data and operational data over a region of interest, and wherein the function relates a set of predictive variables to one or more response variables;
   evaluating the function to identify one or more sweet spots at unique points in the region of interest; and
   generating a GUI for displaying and modifying the function.

7. The program product of claim 6, wherein the set of disparate data sources include horizontal well logs and vertical well logs.

8. The program product of claim 6, wherein the operational data includes production data and engineering data within the region of interest.

9. The program product of claim 6, wherein the geophysical data includes at least one of gamma ray measurements, neutron porosity measurements, or density measurements within the region of interest.

10. The program product of claim 9, wherein the response variable represents production parameters.

11. The computer program product of claim 6, wherein the feature data describes geophysical attributes within the region of interest.

12. A method of using a machine learning platform to perform sweet spotting, comprising:
   collecting geophysical measurements from horizontal well logs and vertical well logs and production information from the horizontal well logs;
   extracting geological measurements from the geophysical measurements and removing outliers from the geological measurements;
   integrating feature data from horizontal well logs and vertical well logs to form a set of integrated feature data by:
      identifying the extracted geological measurements around a vertical well;
      summarizing the extracted geological measurements with a set of representative vertical values including moments and empirical quantiles of a distribution;
      performing a down sampling of a smoothing approximation of the extracted geological measurements and the production information of a horizontal well to obtain a set of representative horizontal values across a path of the horizontal well; and
      joining the set of representative vertical values and the set of representative horizontal values to create the set of integrated feature data;
   generating a data map by interpolating the set of integrated feature data, the data map being continuous over a region of interest such that each data point of the set of integrated feature data is associated with at least one data value;
   integrating operational data into the data map to generate a machine-learning (ML) data map;
   generating, by an interpretable machine learning model, a function based on the ML data map, wherein the function relates a set of predictive variables to one or more response variables;
   evaluating the function to identify a sweet spot in the region of interest; and
   generating a GUI for displaying and modifying the function.

13. The method of claim 12, wherein the response variable represents production parameters.

14. The method of claim 12, wherein the feature data describes geophysical attributes within the region of interest.

15. The method of claim 12, wherein the operational data describes production data and engineering data within the region of interest.

16. The method of claim 12, wherein the geophysical data includes at least one of gamma ray measurements, neutron porosity measurements, or density measurements within the region of interest.

* * * * *